US 011008845B2

(12) United States Patent
Singh et al.

(10) Patent No.: US 11,008,845 B2
(45) Date of Patent: May 18, 2021

(54) METHODS FOR IMPROVING CHANNEL FORMATION

(71) Applicant: Halliburton Energy Services, Inc., Houston, TX (US)

(72) Inventors: Dipti Singh, Kingwood, TX (US); Ubong Inyang, Humble, TX (US); Philip D. Nguyen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/336,077

(22) PCT Filed: Oct. 20, 2016

(86) PCT No.: PCT/US2016/057786
§ 371 (c)(1),
(2) Date: Mar. 22, 2019

(87) PCT Pub. No.: WO2018/075038
PCT Pub. Date: Apr. 26, 2018

(65) Prior Publication Data
US 2019/0242234 A1    Aug. 8, 2019

(51) Int. Cl.
*E21B 43/267* (2006.01)
*C09K 8/80* (2006.01)
(Continued)

(52) U.S. Cl.
CPC ............ *E21B 43/267* (2013.01); *C09K 8/665* (2013.01); *C09K 8/68* (2013.01); *C09K 8/80* (2013.01); *C09K 8/86* (2013.01); *E21B 43/25* (2013.01)

(58) Field of Classification Search
CPC ....... E21B 43/267; E21B 43/25; C09K 8/665; C09K 8/68; C09K 8/80; C09K 8/86
(Continued)

(56) References Cited

U.S. PATENT DOCUMENTS 6,776,235 B1    8/2004  England
7,281,581 B2   10/2007  Nguyen et al.
(Continued)

FOREIGN PATENT DOCUMENTS

WO    2012170522 A1   12/2012
WO    2014035923 A1    3/2014
(Continued)

OTHER PUBLICATIONS

International Search Report & Written Opinion for corresponding international Application No. PCT/US2016/057786, dated Jul. 7, 2017. (pp. 17).
(Continued)

*Primary Examiner* — Matthew R Buck
*Assistant Examiner* — Patrick F Lambe
(74) *Attorney, Agent, or Firm* — McguireWoods, LLP

(57) ABSTRACT

Provided are example methods and systems for treating a subterranean formation. An example method comprises alternately pumping a volume of proppant-laden fluid and a volume of spacer fluid into a wellbore penetrating a subterranean formation. The proppant-laden fluid comprises an aqueous fluid and proppant. The spacer fluid comprises an aqueous fluid. At least one of the proppant-laden fluid or the spacer fluid comprises a synthetic clay. The volume of proppant-laden fluid and the volume of spacer fluid may be pumped in any order. The method further comprises repeating the alternately pumping a volume of proppant-laden fluid and a volume of spacer fluid at least once.

17 Claims, 3 Drawing Sheets

(51) Int. Cl.
*E21B 43/25* (2006.01)
*C09K 8/66* (2006.01)
*C09K 8/86* (2006.01)
*C09K 8/68* (2006.01)

(58) Field of Classification Search
USPC ..................................................... 166/305.1
See application file for complete search history.

(56) References Cited

U.S. PATENT DOCUMENTS

| | | |
|---|---|---|
| 7,325,608 B2 | 2/2008 | van Batenburg et al. |
| 7,581,590 B2 | 9/2009 | Lesko et al. |
| 8,297,357 B2 | 10/2012 | Brenneis et al. |
| 8,490,700 B2 | 7/2013 | Lesko et al. |
| 8,636,065 B2 | 1/2014 | Lesko et al. |
| 8,757,259 B2 | 6/2014 | Lesko et al. |
| 2008/0149329 A1 | 6/2008 | Cooper et al. |
| 2010/0282466 A1 | 11/2010 | Brenneis et al. |
| 2012/0247764 A1 | 10/2012 | Panga et al. |
| 2013/0146292 A1* | 6/2013 | Litvinets ............... C09K 8/80 166/308.1 |
| 2013/0261032 A1* | 10/2013 | Ladva .................. C09K 8/487 507/131 |
| 2015/0299560 A1* | 10/2015 | Robl ..................... C09K 8/62 166/280.2 |
| 2015/0330197 A1* | 11/2015 | Brannon ............... E21B 43/25 166/300 |

FOREIGN PATENT DOCUMENTS

| | | |
|---|---|---|
| WO | 2015048021 A2 | 4/2015 |
| WO | 2015134022 A1 | 9/2015 |
| WO | 2016163983 A1 | 10/2016 |
| WO | 2017069759 A1 | 4/2017 |

OTHER PUBLICATIONS

Nguyen et al.,"Evaluation of Low-Quality Sand for Proppant-Free Channel Fracturing Method" International Petroleum Technology Conference; IPTC-17937-MS (Dec. 10, 2014) 17 pages.

* cited by examiner

METHODS FOR IMPROVING CHANNEL FORMATION

TECHNICAL FIELD

The present disclosure relates to the use of treatment fluids for improving channel formation and more particularly to methods of pulsing a sequence of treatment fluids, at least one or which comprises synthetic clay, to improve channel formation in subterranean formations, and in particular, subterranean formations with high temperatures.

BACKGROUND

Stimulation techniques may be used to increase the amount of hydrocarbons obtained from a subterranean formation. For example, some subterranean formations may be fractured to improve well productivity by placing or enhancing fractures which run from a wellbore into a surrounding subterranean formation.

Once a fracture has been formed, proppant may be used to prop the fracture and prevent the formation pressure from closing the created or enhanced fracture. One technique for propping a fracture is to pump sequenced stages of treatment fluids into the fracture by pulsing the treatment fluids at short intervals and high pressures. Generally, the treatment fluid stages comprise pumping a proppant-laden fluid into the fracture followed by a "spacer" fluid which separates the next stage of proppant-laden fluid. This sequence may be repeated and the fluid volume varied. The proppant in the proppant-laden fluid may be agglomerated into pillar-like structures which prop the fracture and resist the closure pressure of the subterranean formation. The spacer fluid may be used to fill the voids between the proppant pillars and to temporarily support and prop the fracture. The spacer fluid may be removed and flowed out of the fracture, leaving behind channels between the proppant pillars. These channels may have infinite permeability and as such do not restrict through-flow as a traditional proppant pack would. Therefore, this technique may be used to create proppant pillars within the fracture by creating channels around agglomerated proppant particles. The proppant pillars may then stabilize the fracture in the same manner as a traditional proppant pack. However, forming the proppant into pillars allows for channels to form around and between the individual pillars. As such, hydrocarbons may flow through the channels, where permeability is infinite, instead of through a continuous proppant pack where flow may be limited to the interstitial spaces between the individual proppant particles.

Propping fractures with stabilized pillars provides increased conductivity in the fracture relative to traditional methods utilizing a proppant pack. Propping fractures with stabilized pillars is also beneficial in that less proppant is needed and expenses may be reduced. However, as less proppant is used, if the proppant pillars are not successfully formed the fracture may close or decrease in width. One potential cause of failure is that the polymers within the treatment fluids (e.g., the spacer fluid and the proppant-laden fluid) may hydrolyze over time and lose viscosity. Further, when viscosity is lost in the spacer fluid, the spacer fluid may fail to separate stages of the proppant-laden fluid, which may ultimately result in the closing of the fracture. This risk is more pronounced in subterranean formations with higher temperatures, as high temperatures (e.g., temperatures over 200° F.) may accelerate hydrolysis of the polymers, and stability of the spacer fluid may be important to ensure that the proppant aggregates into pillars spaced apart from each other in order to better prop the fracture and to ensure the formation of sufficient conductive flow paths between the proppant pillars.

BRIEF DESCRIPTION OF THE DRAWINGS

Illustrative examples of the present disclosure are described in detail below with reference to the attached drawing figures, which are incorporated by reference herein, and wherein.

Figure 1:
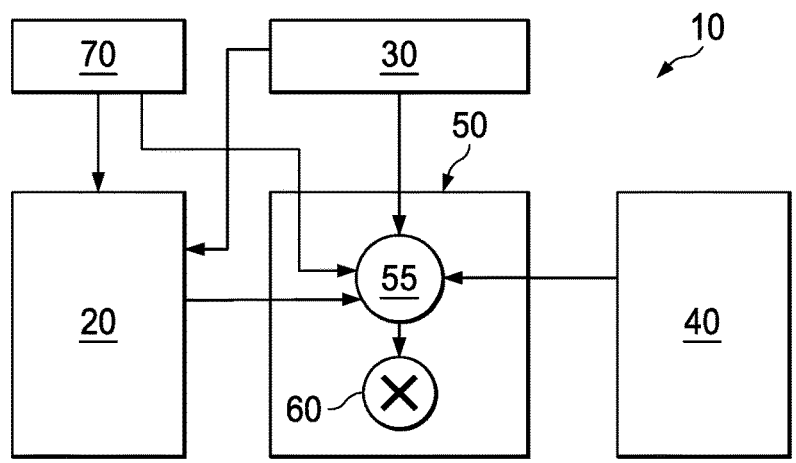
FIG. 1 illustrates a diagram of a treatment fluid production system in accordance with certain examples of the present disclosure.

The illustrated figures are only exemplary and are not intended to assert or imply any limitation with regard to the environment, architecture, design, or process in which different examples may be implemented.

DETAILED DESCRIPTION

The present disclosure relates to the use of treatment fluids for improving channel formation and more particularly to methods of pulsing a sequence of treatment fluids, at least one or which comprises synthetic clay, to improve channel formation in subterranean formations, and in particular, subterranean formations with high temperatures.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods described herein comprise the introduction of treatment fluids into a fracture. The treatment fluids comprise a proppant-laden fluid and a spacer fluid. The proppant-laden fluid comprises an aqueous carrier fluid and proppant. The spacer fluid comprises an aqueous carrier fluid and a synthetic clay. The spacer fluid may not comprise proppant in some examples. In some examples, the proppant-laden fluid also comprises synthetic clay. The treatment fluids may be introduced into a fracture in a subterranean formation. The fracture may be in fluid communication with the wellbore. For example, the proppant-laden fluid may be introduced into the fracture by pumping. The proppant-laden fluid may be pumped into the fracture for a time interval. The spacer fluid may then be introduced into the fracture by pumping. The spacer fluid may be pumped into the fracture for a time interval. The spacer fluid may be pumped into the fracture immediately after the proppant-laden fluid. The treatment fluids may be pumped in stages with no interruption such that one of the treatment fluids may always be pumped into the fracture until the operation is completed. A "stage" is defined as the pumped or to be pumped volume of a treatment fluid sequentially in a series of pumped or to be pumped volumes of other treatment fluids. A "paired stage" is a paired alternating pumping sequence of stages of the treatment fluids, for example, a stage of proppant-laden fluid and a subsequent stage of spacer fluid which immediately follows the stage of proppant-laden fluid in the pumping sequence, or alternatively, a stage of spacer fluid and a subsequent stage of proppant-laden fluid which immediately follows the stage of spacer fluid in the pumping sequence. For example, one stage consists of pumping a volume of proppant-laden fluid. Another stage consists of pumping a volume of spacer fluid. The paired stage is the alternating sequence of the two which may be pumped in any order (i.e., the spacer fluid may be pumped first or second, or the proppant-laden fluid may be pumped first or second). The pumped or to be pumped "volume" of a stage is the total volume of the pumped or to be pumped treatment fluid which includes all components of the treatment fluid (e.g., the proppant and/or synthetic clay) and not just the fluid volume of the aqueous carrier fluid or any other fluid present in the treatment fluid. When the operation is completed at least a portion of the aqueous fluid of the proppant-laden fluid and spacer fluid may be allowed to be drawn out, pushed out, or otherwise flowed out and removed from the fracture, and at least a portion of the synthetic clay may be allowed to be drawn out, pushed out, or otherwise flowed out and removed from the fracture. The proppant from the proppant-laden fluid may form stable pillars within the fracture which may prevent the fracture from closing. Channels may exist between the proppant pillars. These channels are not part of the proppant matrix and are not the interstitial spaces between individual proppant particles. Hydrocarbons may flow from the subterranean formation and into the channels. Hydrocarbons may then flow from the fracture into the wellbore where they may be pumped to the surface.

In the examples described herein, the synthetic clay may comprise a clay produced synthetically or a natural clay which has been modified, for example, through chemical or physical modification. Examples of modification may include sieving, grinding, purification, or chemical modification. Examples of the synthetic clay may include synthetic hectorite clays and synthetic smectite clays. Examples of synthetic hectorite clays include, but are not limited to, a synthetic hectorite clay having a composition by weight on a dry basis of 59.5% $SiO_2$, 27.5% MgO, 0.8% $Li_2O$ and 2.8% $Na_2O$, a synthetic hectorite clay having a composition by weight on a dry basis of 54.5% $SiO_2$, 26.0% MgO, 0.8% $Li_2O$, 5.6% $Na_2O$ and a 4.1% $P_2O_5$ and synthetic hectorite clay having a composition by weight on a dry basis of 54.5% $SiO_2$, 26.0% MgO, 0.8% $LiO_2$, 5.6% $Na_2O$, 4.1% $P_2O_5$, and so on. A commercial example of a synthetic hectorite clay is THERMA-VIS™, available from Halliburton Energy Services, Inc. of Houston, Tex. THERMA-VIS is a trademark of Halliburton Energy Services, Inc. A commercial example of a synthetic smectite clay is LAPONITE®, available from BYK-Gardner GmbH of Geretsried, Germany. LAPONITE is a registered trademark of BYK-Gardner GmbH. In some examples the synthetic clay will not comprise or consist of a kaolin clay (e.g., kaolinite, dickite, halloysite, and nacrite), an illite clay, a chlorite clay, a sepiolite clay, or an attapulgite clay. The synthetic clay may form nanolayers less than 100 nm in thickness when hydrated. The synthetic clay may swell when contacted with an aqueous fluid. The synthetic clay is shear-thinning and self-viscosifying. Shear-thinning describes a non-Newtonian fluid which has a decreased viscosity when subjected to shear strain. Self-viscosifying describes a fluid which increases in viscosity in the absence of shear strain and which is able to do so without the need of gelling agents or other viscosifying additives. The synthetic clay may be thermally stable at temperatures greater than 200° F. For example, the synthetic clay may be thermally stable at temperatures of 250° F., 300° F., 350° F., 400° F., 450° F., 500° F., or greater. As such, the synthetic clay may be placed into fractures within a subterranean formation having a temperature of 350° F., 400° F., 450° F., 500° F., or greater. "Thermal stability," as used herein, refers to the absence of material degradation of the synthetic clay at a specific temperature such that the synthetic clay can no longer provide its intended functionality. Material degradation of the synthetic clay is degradation of the synthetic clay to form one or more different materials which are products of degraded synthetic clay and not synthetic clay itself.

The synthetic clay may be added to an aqueous carrier fluid to form the spacer fluid. In some optional examples, the synthetic clay may also be added to the proppant-laden fluid. The concentration of the synthetic clay in either the spacer fluid or the proppant-laden fluid may range from about 0.1% (w/v) of the selected treatment fluid to about 20% (w/v) of the selected treatment fluid. The concentration of the synthetic clay in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of synthetic clay in the treatment fluid may be about 0.5% (w/v) of the treatment fluid, about 0.7% (w/v) of the treatment fluid, about 1% (w/v) of the treatment fluid, about 1.5% (w/v) of the treatment fluid, or about 2% (w/v) of the treatment fluid. With the benefit of this disclosure, one of ordinary skill in the art will be able to obtain and prepare a treatment fluid comprising synthetic clay for a given application.

In some examples, the spacer fluid and/or the proppant-laden fluid may comprise the combination of a synthetic clay and a natural clay. A natural clay is any clay which has not been modified, for example, through chemical or physical modification. Examples of modification may include sieving, grinding, purification, or chemical modification. When used in combination with a natural clay, the concentration of the synthetic clay in either the spacer fluid or the proppant-laden fluid may be lower than the concentration of a synthetic clay in the selected treatment fluid without the combination of natural clay. For example, the concentration of the synthetic clay when used in a combination with natural clay may range from about 0.01% (w/v) of the selected treatment fluid to about 20% (w/v) of the selected treatment fluid.

In the various examples, the treatment fluids comprise an aqueous carrier fluid used to transport the synthetic clay and/or the proppant into the subterranean formation from the wellbore. The aqueous carrier fluid may generally be from any source. In various examples, the aqueous carrier fluid may comprise fresh water, salt water, seawater, brine, or an aqueous salt solution. In some embodiments, the aqueous carrier fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

Gelling agents comprising various species of celluloses and their derivatives may be optionally added to the spacer fluid and/or the proppant-laden fluid. The gelling agents may increase the viscosity of the treatment fluids. Examples of the gelling agents may include, but are not limited to, carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, guar, guar derivatives, xanthum, or combinations thereof. In a specific example, the gelling agent is an anionic gelling agent. It is to be understood that the gelling agents are optional and may only be used in some examples. The concentration of the gelling agent in a selected treatment fluid may range from about 0.1% (w/v) to about 3% (w/v) of the treatment fluid. The concentration of the gelling agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the gelling agent in the treatment fluid may be about 0.1% (w/v) of the treatment fluid, about 0.5% (w/v) of the treatment fluid, about 1% (w/v) of the treatment fluid, about 2.4% (w/v) of the treatment fluid, or about 3% (w/v) of the treatment fluid. With the benefit of this disclosure, one of ordinary skill in the art will be able to obtain and prepare a treatment fluid comprising a gelling agent for a given application.

Crosslinking agents may be optionally added to the same treatment fluid comprising the optional gelling agent. The crosslinkers may crosslink the gelling agent. The term "crosslinking agent" is defined herein to include any molecule, atom, or ion that is capable of forming one or more crosslinks between molecules of the gelling agent or between one or more atoms in a single molecule of the gelling agent.

The crosslinking agent may comprise a metal ion that is capable of crosslinking the gelling agent. Examples of suitable crosslinking agents include, but are not limited to, borate ions and zirconium ions. These ions may be provided by providing any compound that is capable of producing one or more of these ions. Examples of such compounds include, but are not limited to, boric acid, disodium octaborate tetrahydrate, sodium diborate, pentaborates, ulexite, colemanite, zirconium oxychloride, chelates of zirconium, derivatives thereof, and combinations thereof. Suitable crosslinking agents also include titanium based compounds such as titanium oxychloride or organic titanates, such as titanium chloride and triethyl amine complexes, and aluminium based compounds, such as aluminium acetate, organo aluminium complexes, and the like. It is to be understood that the gelling agents are optional and may only be used in some examples. The concentration of the crosslinking agent in the selected treatment fluid may range from about 0.001% (w/v) of the treatment fluid to about 1% (w/v) of the treatment fluid. The concentration of the crosslinking agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the crosslinking agent in the treatment fluid may be about 0.001% (w/v) of the treatment fluid, about 0.01% (w/v) of the treatment fluid, about 0.1% (w/v) of the treatment fluid, about 0.5% (w/v) of the treatment fluid, or about 1% (w/v) of the treatment fluid. With the benefit of this disclosure, one of ordinary skill in the art will be able to obtain and prepare a treatment fluid comprising a crosslinking agent for a given application.

The proppant-laden treatment fluid comprises proppant particulates and an aqueous carrier fluid. The proppant particulates may include naturally-occurring particles such as sand grains or man-made particles such as resin-coated sand or ceramics. Suitable proppant particulates include, but are not limited to, sand, natural sand, quartz sand, bauxite and other ore, ceramic materials, glass materials, particulate garnet, metal particulates, nylon pellets, polymer materials, polytetrafluoroethylene materials, nut shell pieces, seed shell pieces, fruit pit pieces, wood, or combinations thereof. Suitable proppant particulates may also include composite particulates comprising a binder and a filler material wherein suitable filler materials include silica, alumina, fumed carbon, carbon black, graphite, mica, titanium dioxide, metasilicate, calcium silicate, talc, zirconia, boron, slag, fly ash, hollow glass microspheres, solid glass, or combinations thereof. The proppant particulates may be selected to have one or more properties such as size, sphericity, density, specific gravity, shape, or another property. The concentration of the proppant in the proppant-laden fluid may range from about 1% (w/v) of the proppant-laden fluid to about 50% (w/v) of the proppant-laden fluid. The concentration of the proppant in the proppant-laden fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the proppant in proppant-laden fluid may be about 1% (w/v) of the proppant-laden fluid, about 5% (w/v) of the proppant-laden fluid, about 10% (w/v) of the proppant-laden fluid, about 15% (w/v) of proppant-laden fluid, about 20% (w/v) of the proppant-laden fluid, about 25% (w/v) of the proppant-laden fluid, about 30% (w/v) of the proppant-laden fluid, about 35% (w/v) of the proppant-laden fluid, about 40% (w/v) of the proppant-laden fluid, about 45% (w/v) of the proppant-laden fluid, or about 50% (w/v) of the treatment fluid. With the benefit of this disclosure, one of ordinary skill in the art will be able to obtain and prepare a treatment fluid comprising a crosslinking agent for a given application.

As discussed, the proppant particulates may be variously sized. As used herein, the term "micro," when used to describe proppant particulates, for example, micro proppant particulates, refers to proppant particulates having an average particle size distribution in the range of from about 0.1 micrometers (µm) to about 100 µm, encompassing any value and subset therebetween, such as about 1 µm to about 20 µm, or about 20 µm to about 40 µm, or about 40 µm to about 60 µm, or about 60 µm to about 80 µm, or about 80 µm to about 100 µm, encompassing any value and subset therebetween. In some embodiments, the micro proppant particulates have an average particle size distribution in the range of from a lower limit of about 0.1 µm, 1 µm, 5 µm, 10 µm, 15 µm, 20 µm, 25 µm, 30 µm, 35 µm, 40 µm, 45 µm, and 50 µm to a higher limit of about 100 µm, 95 µm, 90 µm, 85 µm, 80 µm, 75 µm, 70 µm, 65 µm, 60 µm, 55 µm, and 50 µm, encompassing any value and subset therebetween. As used herein, the term "medium," when used to describe proppant particulates, for example, medium proppant particulates, refers to proppant particulates having an average particle size distribution in the range of from about 100 µm to about 200 µm, encompassing any value and subset therebetween, such as about 100 µm to about 120 µm, or about 120 µm to about 140 µm, or about 140 µm to about 160 µm, or about 160 µm to about 180 µm, or about 180 µm to about 200 µm, encompassing any value and subset therebetween. In some examples, the medium proppant particulates have an average particle size distribution in the range of from a lower limit of about 100 µm, 105 µm, 110 µm, 115 µm, 120 µm, 125 µm, 130 µm, 135 µm, 140 µm, 145 µm, and 150 µm to an upper limit of about 200 µm, 195 µm, 190 µm, 185 µm, 180 µm, 175 µm, 170 µm, 165 µm, 160 µm, 155 µm, and 150 µm, encompassing any value and subset therebetween.

As used herein, the term "coarse," when used to describe proppant particulates, for example, coarse proppant particulates, refers to proppant particulates having an average particle size distribution in the range of from about 200 µm to about 5 mm, encompassing any value and subset therebetween, such as about 200 µm to about 340 µm, or about 340 µm to about 480 µm, or about 480 µm to about 620 µm, or about 620 µm to about 760 µm, about 760 µm to about 900 µm, about 900 µm to about 2 mm, or about 2 mm to about 5 mm and encompassing any value and subset therebetween. In some examples, the coarse proppant particulates have an average particle size distribution in the range of from a lower limit of about 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, 1 mm, 1.5 mm, 2 mm, 2.5 mm, and 3 mm to an upper limit of about 5 mm, 4 mm, 3 mm, 2 mm, 1 mm, 900 µm, 850 µm, 800 µm, 750 µm, 700 µm, 650 µm, 600 µm, and 550 µm, encompassing any value and subset therebetween. Each of these values is critical to the examples of the present disclosure and may depend on a number of factors including, but not limited to, the type of proppant particulate selected, the type of subterranean formation being treated, the desired complex fracture geometry, and the like. While overlap in these size ranges may be possible, the selection of the sized proppant particulates may be dependent on a number of factors including, but not limited to, the material of the particulates, the shape of the particulates, the type of subterranean formation, the size of the dominate fracture, and the presence of or desire to create a fracture network, and the like.

The proppant-laden fluid may also optionally comprise a substance used to assist in the agglomeration of the proppant particulates into the proppant pillars. This substance may comprise any of a number of suitable adhesive substances. Examples of suitable adhesive substances include non-aqueous tackifying agents; aqueous tackifying agents; silyl-modified polyamides; and curable resin compositions that are capable of curing to form hardened substances. The adhesive substances may be applied on-the-fly, applying the adhesive substance to the proppant particulate at the well site, directly prior to pumping the proppant-laden fluid into the wellbore. The tacky nature of the adhesive substance may enhance the stability of the proppant particulates as they agglomerate to form the proppant pillars.

Examples of non-aqueous tackifying agents may generally include the condensation reaction products of commercially available polyacids and a polyamine. Such commercial products may include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like.

Suitable non-aqueous tackifying agents may be either used such that they form non-hardening coatings or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some examples, the multifunctional material may be mixed with the tackifying compound in an amount of from about 0.01 to about 50 percent by weight of the tackifying compound to effect formation of the reaction product. In some alternative examples, the compound is present in an amount of from about 0.5 to about 1 percent by weight of the tackifying compound.

Examples of aqueous tackifying agents may generally include charged polymers that comprise compounds that, when in the presence of an aqueous solvent or solution, will form a non-hardening coating (by itself or with an activator) and, when placed on a proppant particulate, will increase the continuous critical resuspension velocity of the proppant particulate when contacted by a stream of water. The aqueous tackifier compound may enhance the grain-to-grain contact between the individual proppant particulates within the formation which may help bring about the consolidation of the proppant particulates into a cohesive, flexible, and permeable mass.

Specific examples of suitable aqueous tackifying agents include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof.

Examples of suitable silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

Examples of curable resins may include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

In some examples it may be desirable to remove the synthetic clay from the fracture when the proppant pillars have been formed. An optional solid acid-precursor may be used to degrade the synthetic clay. Suitable solid acid-precursors may include but are not limited to, polylactic acid (referred to herein as "PLA"), polyglycolic acid (referred to herein as "PGA"), carboxylic acid, lactide, glycolide, copolymers of PLA or PGA, the like or combinations thereof. In some examples, the acid may be coated. The solid-acid precursor may be added to a proppant-laden fluid and/or spacer fluid and pumped into the fracture. Alternatively, a separate treatment fluid which is not a spacer fluid or a proppant-laden fluid and which comprises the solid acid-precursor may be pumped into the fracture. Alternatively, the synthetic clay may be removed with an oxidizer, salt, coated salt, or a combination thereof. The oxidizer, salt, coated salt, or a combination thereof may be may be added to a proppant-laden fluid and/or spacer fluid and pumped into the fracture. Alternatively, a separate treatment fluid which is not a spacer fluid or a proppant-laden fluid may be used to carry the oxidizer, salt, coated salt, or a combination thereof into the fracture.

As discussed above, the synthetic clay may be thermally stable at temperatures greater than 200° F. For example, the synthetic clay may be thermally stable at temperatures of 250° F., 300° F., 350° F., 400° F., 450° F., 500° F., or greater. As such, the synthetic clay may be placed into fractures within a subterranean formation having a temperature of 350° F., 400° F., 450° F., 500° F., or greater. The thermal stability of the synthetic clay allows the synthetic clay to remain sufficiently viscous to assist in suspending proppant within the fracture over time and/or at elevated temperatures. The synthetic clay may reduce proppant settling and/or proppant flowback at higher temperatures and/or over longer period of times relative to traditional suspending agents or viscosity modifiers.

In some optional examples, the treatment fluids may comprise any number of additional additives. The additional additives may include, but are not limited to, salts, surfactants, acids, fluid loss control additives, gas, nitrogen, carbon dioxide, surface modifying agents, foamers, corrosion inhibitors, scale inhibitors, catalysts, biocides, friction reducers, antifoam agents, bridging agents, flocculants, $H_2S$ scavengers, $CO_2$ scavengers, $O_2$ scavengers, lubricants, viscosifiers, breakers, weighting agents, relative permeability modifiers, wetting agents, filter cake removal agents, anti-freeze agents (e.g., ethylene glycol), and the like. A person skilled in the art, with the benefit of this disclosure, will recognize the types of additives that may be included in the treatment fluids of the present disclosure for a particular application.

The methods and systems of the present disclosure may be used during or in conjunction with any subterranean fracturing operation. For example, a treatment fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing operation.

The treatment fluids used in the methods and systems of the present disclosure may be prepared using any suitable method and/or equipment (e.g., blenders, stirrers, etc.). In some examples, the treatment fluids may be prepared at a well site or at an offsite location. Once prepared, a treatment fluid of the present disclosure may be placed in a tank, bin, or other container for storage and/or transport to the site where it is to be used. In other examples, a treatment fluid may be prepared on-site, for example, using continuous mixing or "on-the-fly" methods, as described below.

In some examples, the treatment fluids may be pumped into the subterranean formation at pressure in alternating stages of proppant-laden fluid and spacer fluid. Alternating introduction of the proppant-laden fluid and the spacer fluid may be achieved, in some particular examples, through a fluid pumping strategy such as pump cycling. Pump cycling may include any suitable means of accomplishing the alternating introduction of the treatment fluids. In some examples, pump cycling may include alternating the fed treatment fluid (e.g., the proppant-laden fluid or the spacer fluid) into a single pump for pumping a treatment fluid downhole. In some examples, pump cycling may include the use of two or more pumps, with an individual pump responsible for pumping a stage of treatment fluid downhole in alternating succession. For example, where two pumps are used, a first pump fed by a reservoir of proppant-laden fluid may be cycled on, and then cycled off at substantially the same time that a second pump fed by a reservoir of spacer fluid is cycled on. Then, the second pump may be cycled off at substantially the same time that the first pump is cycled back on again, and so on, such that the end result is the introduction of alternating stages of treatment fluids into the subterranean formation. Pump cycling may produce a continuous stream of fluid into a fracture in the subterranean formation. In some examples, an individual pumping cycle may last no longer than 5 minutes. For example, and individual pumping cycle may comprise a time of 5 minutes, 4 minutes, 3, minutes, 2 minutes, 1 minute, 30 seconds, 25 seconds, 20 seconds, 15 seconds, 10 seconds, 10 seconds, 5 seconds, or less. As a further example, a pump cycling stage may comprise pumping the proppant-laden fluid for 5 seconds and then immediately pumping the spacer fluid for 5 seconds. This process may be repeated for as many stages as desired.

The fluid volumes of the proppant-laden fluid and the spacer fluid (not including the proppant, synthetic clay, or any additional non-fluid additives) may be any volume appropriate for the specific operation. In some examples, the volume ratio of the fluid volume of the proppant-laden fluid to the spacer fluid in a paired stage may be in a range from about 5:1 to about 1:5. For example, the volume ratio of the fluid volume of the proppant-laden fluid and the subsequent spacer fluid may be about 5:1, about 4:1, about 3:1, about 2:1, about 1:1, about 1:2, about, 1:3, about 1:4, or about 1:5. The volume ratio may change from one paired stage to the next. For example, one paired stage may comprise a volume ratio of 4:1. This paired stage may be followed by a paired stage comprising a volume ratio of 3:1. A subsequent paired stage may then have a volume ratio of 4:1, 3:1, 2:1, 1:1, or any ratio therebetween. As will be illustrated in the examples below, the use of synthetic clay in the spacer fluid and, optionally, the proppant-laden fluid may allow for a reduction in the fluid volumes of the proppant-laden fluid and/or the spacer fluid compared to alternative methods which do not utilize synthetic clay. The amount of proppant used may remain the same as in the alternative methods, and since the fluid volume may be reduced, the proppant loading may be increased and therefore a higher concentration of proppant may be used per unit volume of fluid. The fluid volumes of the proppant-laden fluid and the spacer fluid may be varied over the stages and may increase or decrease compared to the previous stage. The total fluid volume used over the operation may be less than the total fluid volume of a comparable operation which does not utilize synthetic clay. Generally, the amount of proppant used may increase in the proppant-laden fluid from stage to subsequent stage as the operation proceeds. Additionally, the size and/or type of the proppant used in the proppant-laden fluid may be altered in subsequent stages. Moreover, one or more of the proppant-laden fluids may comprise proppant of two different types and/or particle sizes. For example, a proppant-laden fluid may comprise a multi-modal particle size distribution.

The injection rates of the proppant-laden fluid and the spacer fluid may be any injection rate appropriate for the specific operation. The injection rates of the proppant-laden fluid and the spacer fluid may be varied over the stages and may increase or decrease compared to the previous stage. The injection rates of the proppant-laden fluid and the spacer fluid in a paired stage may differ and the injection rates of subsequent stages of proppant-laden fluids and spacer fluids may also differ.

The exemplary methods and compositions disclosed herein may directly or indirectly affect one or more components or pieces of equipment associated with the preparation, delivery, recapture, recycling, reuse, and/or disposal of the disclosed treatment fluids. For example, and with reference to FIG. 1, the disclosed methods and treatment fluids may directly or indirectly affect one or more components or pieces of equipment associated with an exemplary system 10, according to one or more embodiments. In certain instances, the system 10 includes a spacer fluid production apparatus 20, an aqueous fluid source 30, a proppant source 40, and a pump and blender system 50 and resides at the surface at a well site where a well 60 is located. The spacer fluid production apparatus 20 combines the synthetic clay with an aqueous fluid from aqueous fluid source 30, to produce the spacer fluid. In other instances, the spacer fluid producing apparatus 20 can be omitted and the spacer fluid may be produced by adding synthetic clay directly to the aqueous fluid from the aqueous fluid source 30.

The proppant source 40 can include proppant for combination with an aqueous fluid from aqueous fluid source 30. The proppant source 40 may be equipped with appropriate metering devices (e.g., valves or and/or other similar mechanisms) that are capable of controlling whether or not proppant is dispensed (and the amount of proppant dispensed) into a blender 55 in the pump and blender system 50 at different points in time during the fracturing job. The proppant source 40 also may include metering devices or other equipment capable of dispensing proppant in pulses or intervals so as to create alternating intervals of proppant-laden fluid and spacer fluid for introduction into well 60. The system may also include optional additive source 70 that provides one or more additives (e.g., gelling agents, weighting agents, and/or other optional additives) to alter the properties of the spacer fluid and/or the proppant-laden fluid. The optional additive source 70 may be coupled to the spacer fluid producing apparatus 20, if present, and/or may be coupled directly to the pump 55. The optional additive source 70 may be included to provide additives to reduce pumping friction, to reduce or eliminate the fluid's reaction to the geological formation in which the well is formed, and/or to serve other functions. For example, optional additive source 70 may be used to hydrate a gelling agent and/or mix a gelling agent with a cross-linking agent, etc. before addition to the aqueous fluid from aqueous fluid source 30.

The pump and blender system 50 may receive the aqueous fluid and combine it with other components, including proppant from the proppant source 40. The pump and blender system 50 may also receive the spacer fluid and combine it with other components. The resulting treatment fluids may be pumped down the well 60. Notably, in certain instances, the spacer fluid production apparatus 20, aqueous fluid source 30, proppant source 40, and/or optional additive source 70 may be equipped with one or more metering devices (not shown) to control the flow of fluids, proppants, additives, and/or other compositions to the pumping and blender system 50. Such metering devices may facilitate the preparation of the treatment fluids in accordance with the present disclosure using continuous mixing or "on-the-fly" methods. Thus, for example, the pumping and blender system 50 may provide repeating stages of variable compositions of proppant-laden fluids and spacer fluids into the wellbore in a continuous fashion for a desired interval of time and at a desired pressure.

Figure 2:
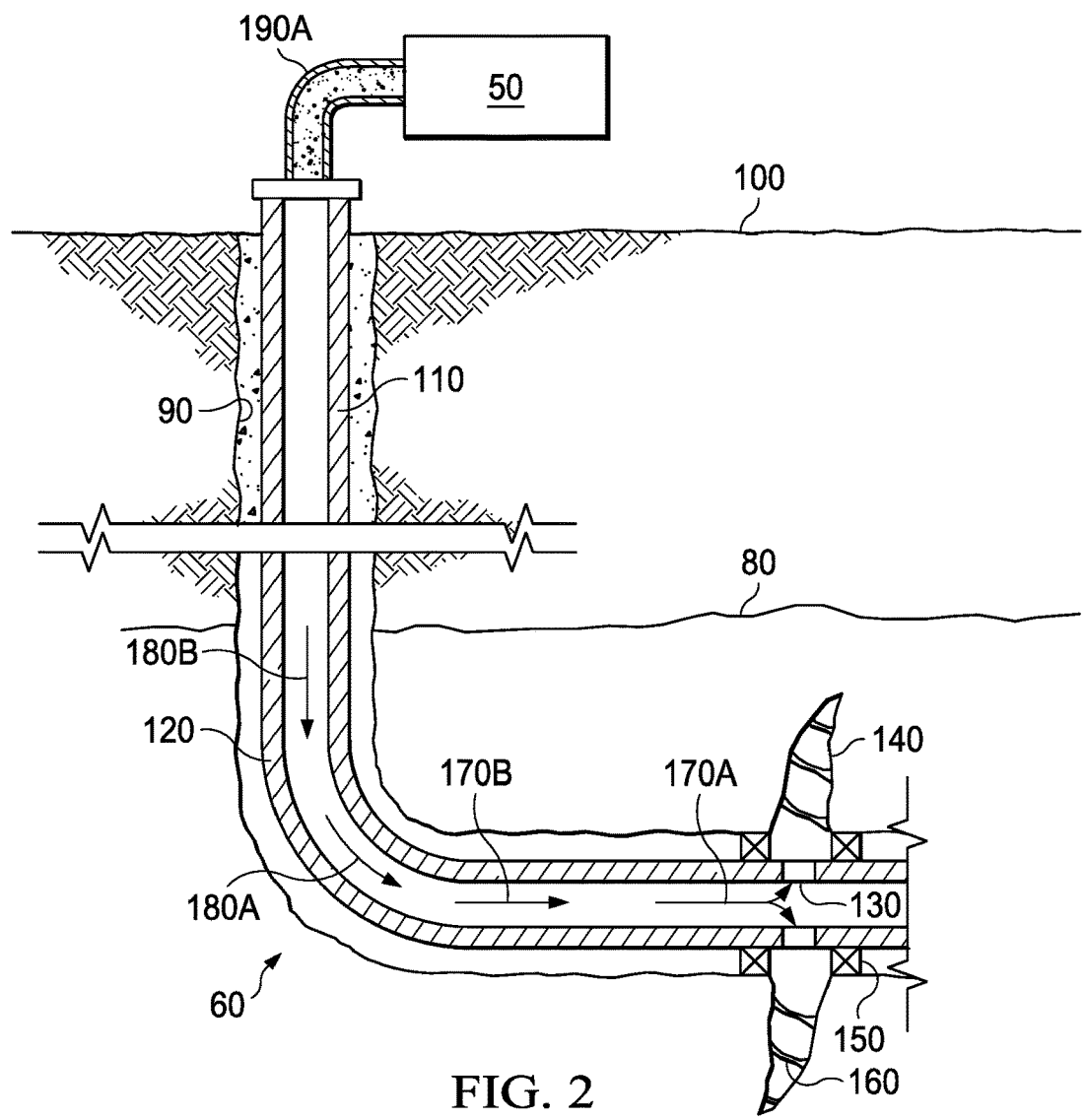
FIG. 2 illustrates a cross-section of a wellbore penetrating a subterranean formation in which a fracture may be treated with a treatment fluid in accordance with certain examples of the present disclosure.

FIG. 2 illustrates the well 60 in a portion of a subterranean formation of interest 80 surrounding a wellbore 90. The wellbore 90 extends from the surface 100. Although shown as vertical deviating to horizontal, the wellbore 90 may include horizontal, vertical, slant, curved, and other types of well bore geometries and orientations, and the treatment fluids may be applied to a subterranean zone surrounding any portion of the wellbore 90. The wellbore 90 may include a casing 110 that is cemented, uncemented or otherwise secured to the wall of the wellbore 90. The wellbore 90 may be uncased or include uncased sections. Perforations may be formed in the casing 110 to allow fracturing fluids and/or other materials to flow into the subterranean formation zone of interest 80. In cased wells, perforations may be formed using shape charges, a perforating gun, hydro jetting and/or other tools.

The well 60 is shown with a work string 120 descending from the surface 100 into the wellbore 90. The pump and blender system 50 is coupled to work string 120 to pump the treatment fluids into the wellbore 90 as is discussed below. The work string 120 may include coiled tubing, jointed pipe, and/or other structures that allow fluid to flow into the wellbore 90. The work string 120 may include flow control devices, bypass valves, ports, and/or other tools or well devices capable of controlling the flow of a fluid from the interior of the work string 120 into the subterranean zone of interest 80. For example, the work string 120 may include ports 130 that are spaced apart from the wall of the wellbore 90 to communicate a treatment fluid into an annulus in the wellbore 90 adjacent a fracture 140 and between the work string 120 and the wall of the wellbore 90. Alternatively, the work string 120 may include ports 130 directly adjacent a fracture 140 in the wall of the wellbore 90 to communicate a treatment fluid directly into the fracture 140. Fracture 140 may have a temperature within of greater than 350° F., greater than 400° F., greater than 450° F., greater than 500° F. or more.

With continued reference to FIG. 2, the work string 120 and/or the wellbore 90 may include one or more sets of packers 150 that seal the annulus between the work string 120 and wellbore 90 to define an interval of the wellbore 90 into which a treatment fluid may be pumped. FIG. 2 illustrates two packers 150, one defining an uphole boundary of the interval and one defining the downhole end of the interval.

Treatment fluids may be introduced into wellbore 90 at a sufficient pressure to enter fracture 140. In the illustrated example of FIG. 2, a propping operation has been performed to produce proppant pillars 160 within fracture 140. Proppant pillars 160 are comprised of proppant. Proppant may be delivered to fracture 140 to produce proppant pillars 160 via a proppant-laden fluid, for example, a stage of proppant-laden fluid 170A. As illustrated, the stage of proppant-laden fluid 170A has been introduced into the work string 120 and may flow into fracture 140 where the proppant may be deposited and agglomerated into proppant pillars 160. The stage of proppant-laden fluid 170A is followed by the stage of spacer fluid 170B. The stage of spacer fluid 170B comprises an aqueous fluid and synthetic clay. The stage of spacer fluid 170B may be used to support fracture 140 while the proppant pillars 160 are being formed. The stage of spacer fluid 170B may also assist with the suspension of the proppant within the fracture 140. The stages of proppant-laden fluid 170A and spacer fluid 170B are a treatment fluid paired stage. This paired stage may be followed in sequence by another paired stage comprising the stage of proppant-laden fluid 180A and the stage of spacer fluid 180B. The stage of proppant-laden fluid 180A and the stage of spacer fluid 180B may be the same or different from the stage of proppant-laden fluid 170A and the stage of spacer fluid 170B. For example, the stages of proppant-laden fluid 180A and/or spacer fluid 180B may comprise different volumes, different proppant, different synthetic clay, different additives, different concentrations of any shared components, different injection rates. The stages may be pumped continuously without interruption or pause. For example, FIG. 2 also illustrates the beginning of an additional stage with proppant-laden fluid 190A exiting pump and blender system 50 to be introduced into work string 120. Any number of stages may be used as desired. The sequence of the stages may be designed to increase the concentration of proppant over time such that later stages comprise higher proppant loading than earlier stages. Completion of the operation may comprise allowing the liquid portion of the treatment fluids to flow out of the fracture 140. The synthetic clay may also flow out of the fracture 140 or a portion may remain in the fracture 140. The synthetic clay may break down over time if any amount remains in the fracture 140. The formed proppant pillars 160 may remain in the fracture. Hydrocarbons may freely flow out of propped fracture 140 via the channels opened between the proppant pillars 160 when the liquid portions of the treatment fluids are flowed out of the fracture 140.

It is also to be recognized that the disclosed treatment fluids may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-2.

EXAMPLES

The present disclosure can be better understood by reference to the following examples which are offered by way of illustration. The present disclosure is not limited to the examples given herein.

Example 1

A comparative example was conducted. The comparative example utilized a control operation comprising a staged sequence for placing proppant in a fracture to form proppant pillars. The spacer fluids in the control sample did not comprise a synthetic clay. The fluid volumes of the proppant-laden fluids and the spacer fluids for the control operation are illustrated in table 1 below:

TABLE 1

Fluid Volumes for Control Operation

| Stage Number | Fluid Volume of Proppant-Laden Fluid (gal) | Stage Number | Fluid Volume of Spacer Fluid (gal) |
|---|---|---|---|
| 1 | 4328 | 2 | 2000 |
| 3 | 2110 | 4 | 1000 |
| 5 | 2110 | 6 | 1000 |
| 7 | 3087 | 8 | 1500 |
| 9 | 2010 | 10 | 1000 |
| 11 | 2010 | 12 | 1000 |
| 13 | 3924 | 14 | 2000 |
| 15 | 3832 | 16 | 2000 |
| 17 | 958 | 18 | 500 |
| 19 | 958 | 20 | 500 |
| 21 | 4790 | 22 | 2500 |
| 23 | 8433 | 24 | 4500 |
| 25 | 7328 | 26 | 4000 |
| 27 | 8055 | 28 | 4500 |
| 29 | 4380 | 30 | 2500 |
| 31 | 2800 | 32 | 500 |

An experimental operation was conducted to compare to the controlled operation. The experimental operation comprised the same stages for the proppant-laden fluid and comprised the same amount of proppant loading in the proppant-laden fluid. The spacer fluids comprised synthetic clay and significantly lower fluid volumes than the control sample. The fluid volumes of the proppant-laden fluid and the spacer fluid for the experimental operation are illustrated in table 2 below:

TABLE 2

Fluid Volumes for First Experimental Operation

| Stage Number | Fluid Volume of Proppant-Laden Fluid (gal) | Stage Number | Fluid Volume of Spacer Fluid (gal) |
|---|---|---|---|
| 1 | 4328 | 2 | 2000 |
| 3 | 2110 | 4 | 1000 |
| 5 | 2110 | 6 | 1000 |
| 7 | 3087 | 8 | 1500 |
| 9 | 2010 | 10 | 1000 |
| 11 | 2010 | 12 | 1000 |
| 13 | 3924 | 14 | 2000 |
| 15 | 3832 | 16 | 500 |
| 17 | 958 | 18 | 500 |
| 19 | 958 | 20 | 2500 |
| 21 | 4790 | 22 | 1000 |
| 23 | 8433 | 24 | 4800 |
| 25 | 7328 | 26 | 4500 |
| 27 | 8055 | 28 | 2500 |
| 29 | 4380 | 30 | 500 |
| 31 | 2800 | 32 | NA |

Figure 3:
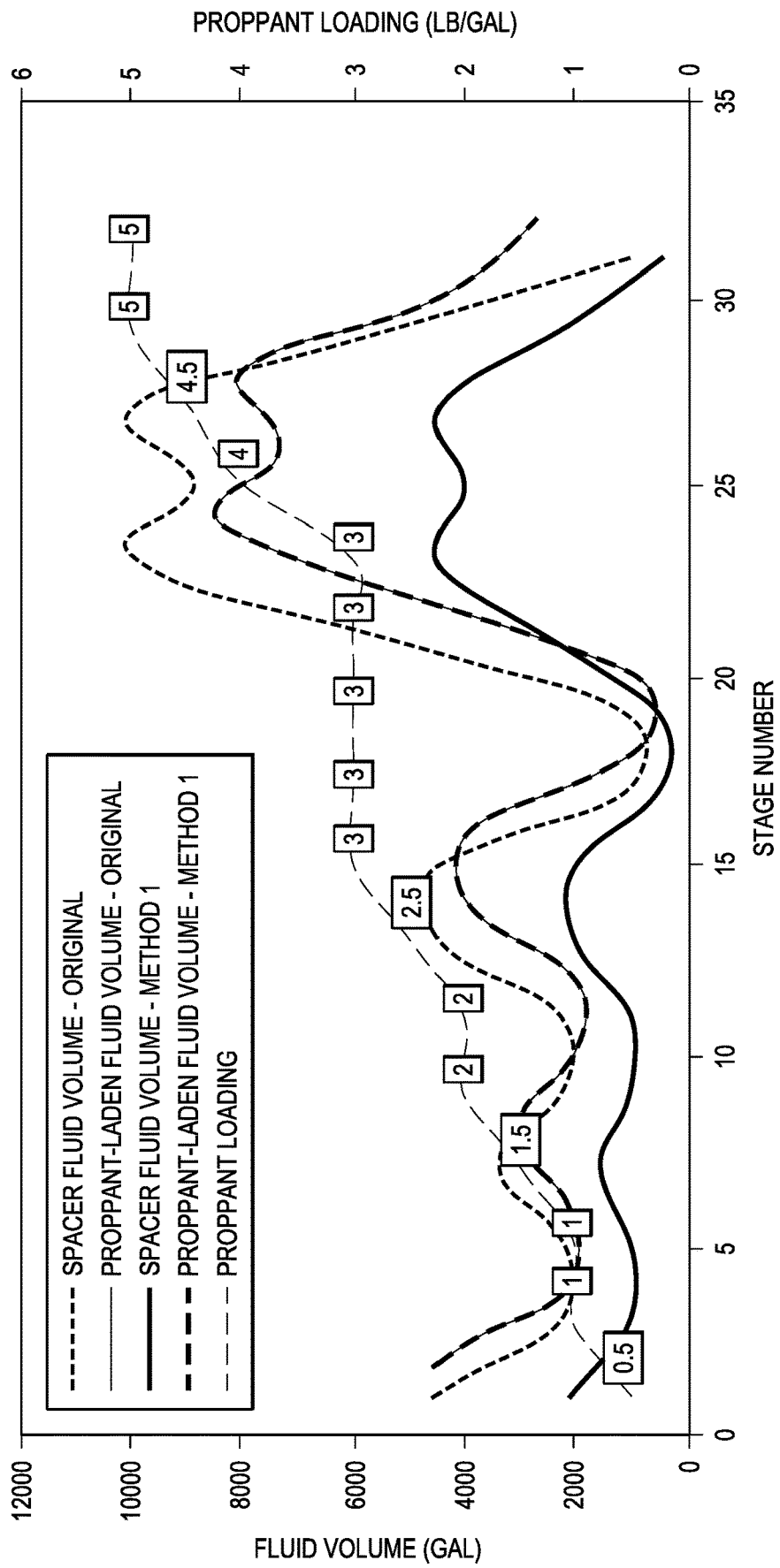
FIG. 3 illustrates a plot of the fluid volume of various examples of treatment fluids over the course of a staged treatment operation in accordance with certain examples of the present disclosure.

FIG. 3 illustrates the results of the comparative example which indicate that the use of synthetic clay in the spacer fluid allows for less fluid volume to be used to produce the space fluid and that this decrease in fluid volume does not decrease the amount of proppant which may be successfully deposited in the fracture.

Example 2

A second comparative example was conducted. The comparative example utilized the same control operation illustrated in Table 1 and FIG. 3. A second experimental operation was conducted to compare to the controlled operation. The second experimental operation comprised the same stages for the proppant-laden fluid and comprised the same amount of proppant loading in the proppant-laden fluid. The spacer fluids comprised synthetic clay and significantly lower fluid volumes than the control sample. The fluid volumes of the proppant-laden fluid and the spacer fluid for the experimental operation are illustrated in table 2 below:

TABLE 3

Fluid Volumes for Second Experimental Operation

| Stage Number | Fluid Volume of Proppant-Laden Fluid (gal) | Stage Number | Fluid Volume of Spacer Fluid (gal) |
|---|---|---|---|
| 1 | 2000 | 2 | 2000 |
| 3 | 2110 | 4 | 1000 |
| 5 | 2058 | 6 | 1000 |
| 7 | 3087 | 8 | 1500 |
| 9 | 2010 | 10 | 1000 |
| 11 | 1962 | 12 | 1000 |
| 13 | 3832 | 14 | 2000 |
| 15 | 958 | 16 | 500 |
| 17 | 958 | 18 | 500 |
| 19 | 4790 | 20 | 2500 |
| 21 | 1874 | 22 | 1000 |
| 23 | 9040 | 24 | 4800 |
| 25 | 9909 | 26 | 4500 |
| 27 | 7445 | 28 | 2500 |
| 29 | 2800 | 30 | 500 |

Figure 4:
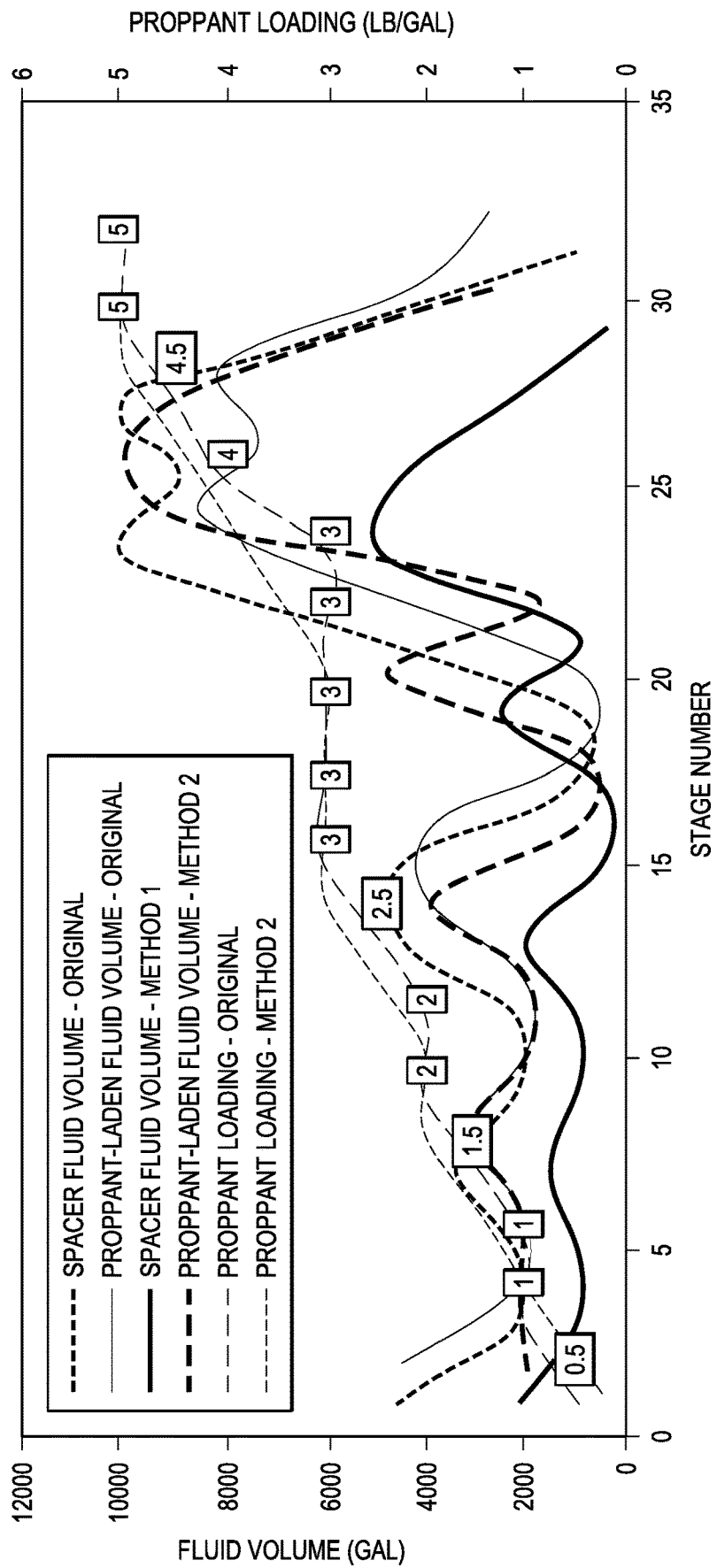
FIG. 4 illustrates another plot of the fluid volume of various examples of treatment fluids over the course of a staged treatment operation in accordance with certain examples of the present disclosure.

FIG. 4 illustrates the results of the comparative example which indicate that the use of synthetic clay in the spacer fluid allows for less fluid volume overall for the proppant-laden fluid and the spacer fluid while maintaining the same or greater than amount of proppant loading.

Provided are methods for treating a subterranean formation in accordance with the description provided herein and as illustrated by FIGS. 1-4. An example method comprises alternately pumping a volume of proppant-laden fluid and a volume of spacer fluid into a wellbore penetrating a subterranean formation; wherein the proppant-laden fluid comprises an aqueous fluid and proppant; wherein the spacer fluid comprises an aqueous fluid; wherein at least one of the proppant-laden fluid or the spacer fluid comprises a synthetic clay; and wherein the volume of proppant-laden fluid and the volume of spacer fluid may be pumped in any order; and repeating the alternately pumping a volume of proppant-laden fluid and a volume of spacer fluid at least once. At least two of the volumes of proppant-laden fluid may differ in fluid volume. At least two of the volumes of spacer fluid may differ in fluid volume. The injection rate of a pumped volume of proppant-laden fluid may differ from the injection rate of a pumped volume of spacer fluid. At least two of the pumped volumes of proppant-laden fluid may differ in injection rates. At least two of the pumped volumes of spacer fluid may differ in injection rates. The pump time for a volume of proppant-laden fluid may be less than 60 seconds. The pump time for a volume of spacer fluid may be less than 60 seconds. The volume ratio of a sequentially pumped volume of proppant-laden fluid to a volume of spacer fluid may be in a range from about 5:1 to about 1:5. The concentration of proppant in a volume of proppant-laden fluid may be different from the concentration of proppant in another volume of proppant-laden fluid. The proppant in a volume of proppant-laden fluid may differ from the proppant in another volume of proppant-laden fluid in a property selected from the group consisting of: type of proppant particulate, average particle size distribution, proppant sphericity, proppant specific gravity, proppant shape, and combinations thereof. At least one volume of spacer fluid may comprise a micro-proppant having an average particle size distribution in the range of from about 0.1 micrometers (μm) to about 100 μm. The synthetic clay may be a synthetic hectorite clay in a concentration in a stage of the spacer fluid in an amount from about 0.1% (w/v) to about 20% (w/v). The volume of proppant-laden fluid and a volume of spacer fluid may be pumped into a fracture within a subterranean formation. A temperature within the fracture may be greater than 200° F.

Provided are methods for treating a subterranean formation in accordance with the description provided herein and as illustrated by FIGS. 1-4. An example method comprises alternately pumping a volume of proppant-laden fluid and a volume of spacer fluid into a fracture in a subterranean formation; wherein the proppant-laden fluid comprises an aqueous fluid, a gelling agent, and proppant; wherein the spacer fluid comprises an aqueous fluid; wherein at least one of the proppant-laden fluid or the spacer fluid comprises a synthetic clay; wherein the pump time for the volume of proppant-laden fluid is less than 60 seconds; wherein the pump time for the volume of spacer fluid is less than 60 seconds; and wherein the volume of proppant-laden fluid and the volume of spacer fluid may be pumped in any order; and repeating the alternately pumping a volume of proppant-laden fluid and a volume of spacer fluid at least once. At least two of the volumes of proppant-laden fluid may differ in fluid volume. At least two of the volumes of spacer fluid may differ in fluid volume. The injection rate of a pumped volume of proppant-laden fluid may differ from the injection rate of a pumped volume of spacer fluid. At least two of the pumped volumes of proppant-laden fluid may differ in injection rates. At least two of the pumped volumes of spacer fluid may differ in injection rates. The pump time for a volume of proppant-laden fluid may be less than 60 seconds. The pump time for a volume of spacer fluid may be less than 60 seconds. The volume ratio of a sequentially pumped volume of proppant-laden fluid to a volume of spacer fluid may be in a range from about 5:1 to about 1:5. The concentration of proppant in a volume of proppant-laden fluid may be different from the concentration of proppant in another volume of proppant-laden fluid. The proppant in a volume of proppant-laden fluid may differ from the proppant in another volume of proppant-laden fluid in a property selected from the group consisting of: type of proppant particulate, average particle size distribution, proppant sphericity, proppant specific gravity, proppant shape, and combinations thereof. At least one volume of spacer fluid may comprise a micro-proppant having an average particle size distribution in the range of from about 0.1 micrometers (μm) to about 100 μm. The synthetic clay may be a synthetic hectorite clay in a concentration in a stage of the spacer fluid in an amount from about 0.1% (w/v) to about 20% (w/v). A temperature within the fracture may be greater than 200° F.

Provided are systems for treating a subterranean formation in accordance with the description provided herein and as illustrated by FIGS. 1-4. An example system comprises at least two volumes of spacer fluid, each individual volume comprising an aqueous carrier fluid; at least two volumes of proppant-laden fluid, each individual volume comprising an aqueous fluid and proppant; wherein at least one of the proppant-laden fluid or the spacer fluid comprises a synthetic clay; a spacer fluid production apparatus; an aqueous fluid source; a proppant source; and a pump and blender system configured to repeatedly pump and alternate the pumping of a volume of proppant-laden fluid and a volume of spacer fluid into the fracture. At least two of the volumes of proppant-laden fluid may differ in fluid volume. At least two of the volumes of spacer fluid may differ in fluid volume. The injection rate of a pumped volume of proppant-laden fluid may differ from the injection rate of a pumped volume of spacer fluid. At least two of the pumped volumes of proppant-laden fluid may differ in injection rates. At least two of the pumped volumes of spacer fluid may differ in injection rates. The pump time for a volume of proppant-laden fluid may be less than 60 seconds. The pump time for a volume of spacer fluid may be less than 60 seconds. The volume ratio of a sequentially pumped volume of proppant-laden fluid to a volume of spacer fluid may be in a range from about 5:1 to about 1:5. The concentration of proppant in a volume of proppant-laden fluid may be different from the concentration of proppant in another volume of proppant-laden fluid. The proppant in a volume of proppant-laden fluid may differ from the proppant in another volume of proppant-laden fluid in a property selected from the group consisting of: type of proppant particulate, average particle size distribution, proppant sphericity, proppant specific gravity, proppant shape, and combinations thereof. At least one volume of spacer fluid may comprise a micro-proppant having an average particle size distribution in the range of from about 0.1 micrometers (μm) to about 100 μm. The synthetic clay may be a synthetic hectorite clay in a concentration in a stage of the spacer fluid in an amount from about 0.1% (w/v) to about 20% (w/v). The volume of proppant-laden fluid and a volume of spacer fluid may be pumped into a fracture within a subterranean formation. A temperature within the fracture may be greater than 200° F.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of treating a subterranean formation comprising:
   alternately pumping a volume of proppant-laden fluid and a volume of spacer fluid into a wellbore penetrating the subterranean formation; wherein the proppant-laden fluid comprises an aqueous fluid, an adhesive substance comprising a mixture of a non-aqueous tackifying agent and a multifunctional material selected from the group consisting of aldehydes, dialdehydes, hemiacetals, diacid halides, dihalides, polyacid anhydrides, epoxides, furfuraldehyde, glutaraldehyde, aldehyde condensates, and any combination thereof, and proppant; wherein the proppant comprises a micro-proppant having a particle size between 0.1 micrometers and 100 micrometers; wherein the micro-proppant is present in the proppant-laden fluid in an amount between 1% (w/v) to 50% (w/v); wherein the spacer fluid comprises an aqueous fluid and a solid acid-precursor; wherein at least one of the proppant-laden fluid or the spacer fluid comprises a synthetic clay in an amount of 0.1% (w/v) to about 20% (w/v); and wherein the volume of proppant-laden fluid and the volume of spacer fluid may be pumped in any order; wherein at least two of the volumes of proppant-laden fluid differ in fluid volume; and repeating the alternately pumping a volume of proppant-laden fluid and a volume of spacer fluid at least once.

2. The method of claim 1, wherein at least two of the volumes of spacer fluid differ in fluid volume.

3. The method of claim 1, wherein the injection rate of a pumped volume of proppant-laden fluid differs from the injection rate of a pumped volume of spacer fluid.

4. The method of claim 1, wherein at least two of the pumped volumes of proppant-laden fluid differ in injection rates.

5. The method of claim 1, wherein at least two of the pumped volumes of spacer fluid differ in injection rates.

6. The method of claim 1, wherein the pump time for a volume of proppant-laden fluid is less than 60 seconds.

7. The method of claim 1, wherein the pump time for a volume of spacer fluid is less than 60 seconds.

8. The method of claim 1, wherein the volume ratio of a sequentially pumped volume of proppant-laden fluid to a volume of spacer fluid is in a range from about 5:1 to about 1:5.

9. The method of claim 1, wherein the concentration of proppant in a volume of proppant-laden fluid is different from the concentration of proppant in another volume of proppant-laden fluid.

10. The method of claim 1, wherein the proppant in a volume of proppant-laden fluid differs from the proppant in another volume of proppant-laden fluid in a property selected from the group consisting of: type of proppant particulate, average particle size distribution, proppant sphericity, proppant specific gravity, proppant shape, and combinations thereof.

11. The method of claim 1, wherein at least one volume of spacer fluid comprises a micro-proppant having an average particle size distribution in the range of from about 0.1 micrometers (μm) to about 100 μm.

12. A method of treating a subterranean formation comprising:

alternately pumping a volume of proppant-laden fluid and a volume of spacer fluid into a fracture in the subterranean formation; wherein the proppant-laden fluid comprises an aqueous fluid, a gelling agent, an adhesive substance comprising a mixture of a non-aqueous tackifying agent and a multifunctional material selected from the group consisting of aldehydes, dialdehydes, hemiacetals, diacid halides, dihalides, polyacid anhyrides, epoxides, furfuraldehyde, glutaraldehyde, aldehyde condensates, and any combination thereof, and proppant; wherein the proppant comprises a micro-proppant having a particle size between 0.1 micrometers and 100 micrometers; wherein the micro-proppant is present in the proppant-laden fluid in an amount between 1% (w/v) to 50% (w/v); wherein the spacer fluid comprises an aqueous fluid and a solid acid-precursor; wherein at least one of the proppant-laden fluid or the spacer fluid comprises a synthetic clay in an amount of 0.1% (w/v) to about 20% (w/v); wherein the pump time for the volume of proppant-laden fluid is less than 60 seconds; wherein the pump time for the volume of spacer fluid is less than 60 seconds; and wherein the volume of proppant-laden fluid and the volume of spacer fluid may be pumped in any order; wherein at least two of the volumes of proppant-laden fluid differ in fluid volume, wherein at least two of the volumes of spacer fluid differ in fluid volume; and repeating the alternately pumping a volume of proppant-laden fluid and a volume of spacer fluid at least once.

13. The method of claim 12, wherein the injection rate of a pumped volume of proppant-laden fluid differs from the injection rate of a pumped volume of spacer fluid, wherein at least two of the pumped volumes of proppant-laden fluid differ in injection rates, wherein at least two of the pumped volumes of spacer fluid differ in injection rates.

14. The method of claim 12, wherein the synthetic clay is a synthetic hectorite clay.

15. The method of claim 12, wherein a temperature within the fracture is greater than 200° F.

16. A system for treating a fracture in a subterranean formation:

at least two volumes of spacer fluid, each individual volume comprising an aqueous carrier fluid;

at least two volumes of proppant-laden fluid, each individual volume comprising an aqueous fluid, an adhesive substance, and proppant; wherein the proppant in at least one individual volume of the proppant-laden fluid comprises a micro-proppant having a particle size between 0.1 micrometers and 100 micrometers; wherein the micro-proppant is present in the in at least one individual volume of the proppant-laden fluid in an amount between 1% (w/v) to 50% (w/v); wherein at least one of the proppant-laden fluid or the spacer fluid comprises a synthetic clay in an amount of 0.1% (w/v) to about 20% (w/v); wherein the at least two volumes of proppant-laden fluid differ in fluid volume;

a spacer fluid production apparatus;

an aqueous fluid source;

a proppant source;

a non-aqueous tackifying agent;

a multifunctional material selected from the group consisting of aldehydes, dialdehydes, hemiacetals, diacid halides, dihalides, polyacid anhyrides, epoxides, furfuraldehyde, glutaraldehyde, aldehyde condensates, and any combination thereof;

a solid acid-precursor; and a pump and blender system configured to repeatedly pump and alternate the pumping of a volume of proppant-laden fluid and a volume of spacer fluid into the fracture.

17. The system of claim 16, wherein the at least two volumes of proppant-laden differ in concentration of proppant.

* * * * *